US008620654B2

United States Patent
Khouri et al.

(10) Patent No.: US 8,620,654 B2
(45) Date of Patent: Dec. 31, 2013

(54) TEXT ORIENTED, USER-FRIENDLY EDITING OF A VOICEMAIL MESSAGE

(75) Inventors: Joseph F. Khouri, San Jose, CA (US); Laurent Philonenko, San Francisco, CA (US); Mukul Jain, San Jose, CA (US); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1107 days.

(21) Appl. No.: 11/880,152

(22) Filed: Jul. 20, 2007

(65) Prior Publication Data

US 2009/0024389 A1   Jan. 22, 2009

(51) Int. Cl.
*G10L 15/00*   (2013.01)

(52) U.S. Cl.
USPC .......... 704/235; 704/246; 704/247; 704/251; 704/252

(58) Field of Classification Search
None
See application file for complete search history.

(56) References Cited

U.S. PATENT DOCUMENTS

| | | | |
|---|---|---|---|
| 4,993,022 A | 2/1991 | Kondo et al. | |
| 5,675,778 A | 10/1997 | Jones | |
| 5,729,687 A | 3/1998 | Rothrock et al. | |
| 5,983,192 A | 11/1999 | Botzko et al. | |
| 6,009,519 A | 12/1999 | Jones et al. | |
| 6,014,427 A | 1/2000 | Hanson et al. | |
| 6,236,854 B1 | 5/2001 | Bradshaw, Jr. | |
| 6,259,405 B1 | 7/2001 | Stewart et al. | |
| 6,342,903 B1 | 1/2002 | Fado et al. | |
| 6,438,215 B1 | 8/2002 | Skladman et al. | |
| 6,496,201 B1 | 12/2002 | Baldwin et al. | |
| 6,501,739 B1 | 12/2002 | Cohen | |
| 6,545,596 B1 | 4/2003 | Moon | |
| 6,590,604 B1 | 7/2003 | Tucker et al. | |
| 6,604,078 B1 | 8/2003 | Shimazaki | |
| 6,608,820 B1 | 8/2003 | Bradshaw, Jr. | |
| 6,671,262 B1 | 12/2003 | Kung et al. | |
| 6,816,469 B1 | 11/2004 | Kung et al. | |
| 6,865,540 B1 | 3/2005 | Faber et al. | |

(Continued)

FOREIGN PATENT DOCUMENTS

EP   1 170 726 A   1/2008

OTHER PUBLICATIONS

Greg Vaundreuil Lucent Technologies Glenn Parsons Nortel Networks:"Voice Profile for Internet Mail—version 3; draft-ema-vpimv3-00.txt", IETF Standart-Working-Draft, Internet Engineering Task Force, IETF, CH, Feb. 1, 1992, 47 pages, Feb. 1, 1999.

(Continued)

*Primary Examiner* — Leonard Saint Cyr
(74) *Attorney, Agent, or Firm* — Baker Botts L.L.P.

(57) ABSTRACT

A system in one embodiment includes a server associated with a unified messaging system (UMS). The server records speech of a user as an audio data file, translates the audio data file into a text data file, and maps each word within the text data file to a corresponding segment of audio data in the audio data file. A graphical user interface (GUI) of a message editor running on an endpoint associated with the user displays the text data file on the endpoint and allows the user to identify a portion of the text data file for replacement. The server being further operable to record new speech of the user as new audio data and to replace one or more segments of the audio data file corresponding to the portion of the text with the new audio data.

7 Claims, 5 Drawing Sheets

(56) References Cited

U.S. PATENT DOCUMENTS

| | | | |
|---|---|---|---|
| 6,876,734 B1 | 4/2005 | Summers et al. | |
| 6,885,900 B1 | 4/2005 | Rybicki et al. | |
| 6,895,257 B2* | 5/2005 | Boman et al. | 455/556.1 |
| 6,905,414 B2 | 6/2005 | Danieli et al. | |
| 6,907,112 B1 | 6/2005 | Guedalia et al. | |
| 6,909,778 B2 | 6/2005 | Wengrovitz | |
| 6,931,001 B2 | 8/2005 | Deng | |
| 6,931,113 B2 | 8/2005 | Ortel | |
| 6,970,908 B1 | 11/2005 | Larky | |
| 6,985,745 B2 | 1/2006 | Quaid | |
| 6,987,744 B2 | 1/2006 | Harrington et al. | |
| 7,251,313 B1* | 7/2007 | Miller et al. | 379/88.01 |
| 2002/0098831 A1 | 7/2002 | Castell et al. | |
| 2002/0124057 A1 | 9/2002 | Besprosvan | |
| 2003/0046634 A1 | 3/2003 | Kikuchi et al. | |
| 2004/0008827 A1* | 1/2004 | Martin et al. | 379/67.1 |
| 2004/0086095 A1 | 5/2004 | Dixit | |
| 2004/0162747 A1 | 8/2004 | Yeh et al. | |
| 2004/0234046 A1 | 11/2004 | Skladman et al. | |
| 2005/0013419 A1* | 1/2005 | Pelaez et al. | 379/88.14 |
| 2005/0037739 A1 | 2/2005 | Zhong | |
| 2005/0135383 A1 | 6/2005 | Shenefiel | |
| 2005/0157708 A1 | 7/2005 | Chun | |
| 2005/0177622 A1 | 8/2005 | Spielman et al. | |
| 2005/0210112 A1 | 9/2005 | Clement et al. | |
| 2005/0262208 A1 | 11/2005 | Haviv et al. | |
| 2005/0267761 A1* | 12/2005 | Ueno | 704/277 |
| 2006/0078120 A1 | 4/2006 | Mahendran et al. | |
| 2006/0122835 A1 | 6/2006 | Huart et al. | |
| 2006/0146735 A1 | 7/2006 | Shaffer et al. | |
| 2007/0036290 A1* | 2/2007 | Gasparri et al. | 379/88.12 |
| 2007/0293272 A1* | 12/2007 | Salmon | 455/566 |

OTHER PUBLICATIONS http://www.bestsoftware4download.com/sofware/t-free-wave-to-text-download-dqzghtje.html, Mar. 25, 2013.
http://www.catauto.com/ed1000w.html; ED-1000 Windows Editor Program, Mar. 22, 2013.
http://www.catauto.com/ed300dxl.html; ED-300DXL Configuration Editor Program, Mar. 22, 2013.
http://www.goldwave.com/; Goldwave, Inc., Mar. 22, 2013.
http://www.snapfiles.com/get/soliton.html; Mar. 22, 2013.
http://www.voicemailspecial.com/, Mar. 22, 2013.

* cited by examiner

TEXT ORIENTED, USER-FRIENDLY EDITING OF A VOICEMAIL MESSAGE

FIELD OF THE INVENTION

The present disclosure relates generally to the field of electronic messaging, including voice messaging, over telephony networks.

BACKGROUND OF THE INVENTION

Voice messaging systems that enable users to send and retrieve voice mail messages are known in the communication arts. In a typical prior art voice messaging system a telephone is attached to a private branch exchange (PBX) that utilizes a notification mechanism to notify a message recipient that a new message is waiting for them. Today, many modern communication systems provide messaging services via packet-based networks, i.e., those that operate in accordance with the Internet Protocol (IP). A Unified Messaging/Voicemail System (UMS) handles voice, facsimile, regular text messages, and computer-readable documents as objects in a single mailbox that a user can access either with a regular email client, or by telephone. A UM system usually connects to a PBX to provide automated attendant, audiotext, and voicemail services to subscribers or users. For instance, a personal computer (PC) user with multimedia capabilities typically can open and playback voice messages, either as speech or text.

In a modern UMS, when a user who is recording a voice message makes a mistake he is usually forced to delete the message and re-record the entire voice message using a standard Telephony User Interface (TUI), e.g., to record, delete, re-record, send, etc. This is particularly time consuming and irritating when the voicemail message is lengthy, which also increases the likelihood of making another error during re-recording of the voice message.

BRIEF DESCRIPTION OF THE DRAWINGS

The present disclosure will be understood more fully from the detailed description that follows and from the accompanying drawings, which however, should not be taken to limit the invention to the specific embodiments shown, but are for explanation and understanding only.

DETAILED DESCRIPTION

In the following description specific details are set forth, such as device types, system configurations, protocols, methods, etc., in order to provide a thorough understanding of the disclosure herein. However, persons having ordinary skill in the relevant arts will appreciate that these specific details may not be needed to practice the embodiments described.

In the context of the present application, a communications network is a geographically distributed collection of interconnected subnetworks for transporting data between nodes, such as intermediate nodes and end nodes (also referred to as endpoints). A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the devices or nodes include servers, mixers, control units, and personal computers. The nodes typically communicate by exchanging discrete frames or packets of data according to predefined protocols.

A "voicemail system", as that term is used in the present disclosure, refers to a computer system (e.g., a UMS) or network, or more expansive systems that include gateway devices attached to other computer systems, thus enabling users to send/retrieve recorded multimedia messages anywhere in the world. A "voicemail" or multimedia message which comprises voice, video, text, etc., is a recorded (e.g., audio) message stored in such a computerized system. An endpoint is any device, component, element, or object capable of recording, editing, sending or receiving a voicemail message over a network. An endpoint may comprise a personal computer (PCs), workstation, personal digital assistant (PDA), laptop or notebook computer, VoIP phone, or other communications equipment. A Unified Messaging (or UM) system is a computerized system that integrates different streams of messages (e-mail, fax, voice, video, etc.) into a single "in-box", accessible from a variety of different endpoint devices.

Speech-to-text (STT) technology is a known method of transforming speech into a text file. Similarly, a text-to-speech (TTS) system converts normal language text into speech. Direct editing of audio files, e.g., a .WAV file, is also a known technology. (WAV or WAVE is short for Waveform audio format, which is a Microsoft and IBM audio file format standard for storing audio on PCs.) Examples these latter types of voice editors can be found at http://www.catauto.com/ed1000w.html; http://www.catauto.com/ed300dxl.html; http://www.goldwave.com; http://www.snapfiles.com/get/soliton.html; and http://www.voicemail-special.com/. The difficulty with these voice editors is that the user only sees the audio "wavefront" and must move the cursor in a "hit or miss" trial fashion trying to locate the exact place of the error.

According to one embodiment of the present invention, a UMS provides a user with a textual view for editing a voicemail message that has been recorded, but not yet sent. The user may edit the voicemail message by highlighting a word or portion of the displayed text and then either typing new text or recording new speech that replaces the audio data corresponding to the highlighted text. That is, the user may edit his voicemail message without having to listen to any portion of the recording. Once editing of the voicemail message has been completed, the user may send the edited voicemail message as one or more audio data files to the intended recipient's mailbox.

The UMS handles the edited voicemail message just like any other rich-media UMS message. That is, the UMS handles the edited voicemail message as one or more objects in a single mailbox that the receiver can access either with a regular endpoint device, such as a personal computer, (PC), a telephone, or other suitable communications device. The edited audio file(s) may also be filtered or processed to eliminate or minimize any differences in volume, tone, noise levels, etc., between the original recording and the edited portions. This post-recording processing of the message smoothes out the speech, thereby making the edited portions undetectable to the recipient.

Figure 1:
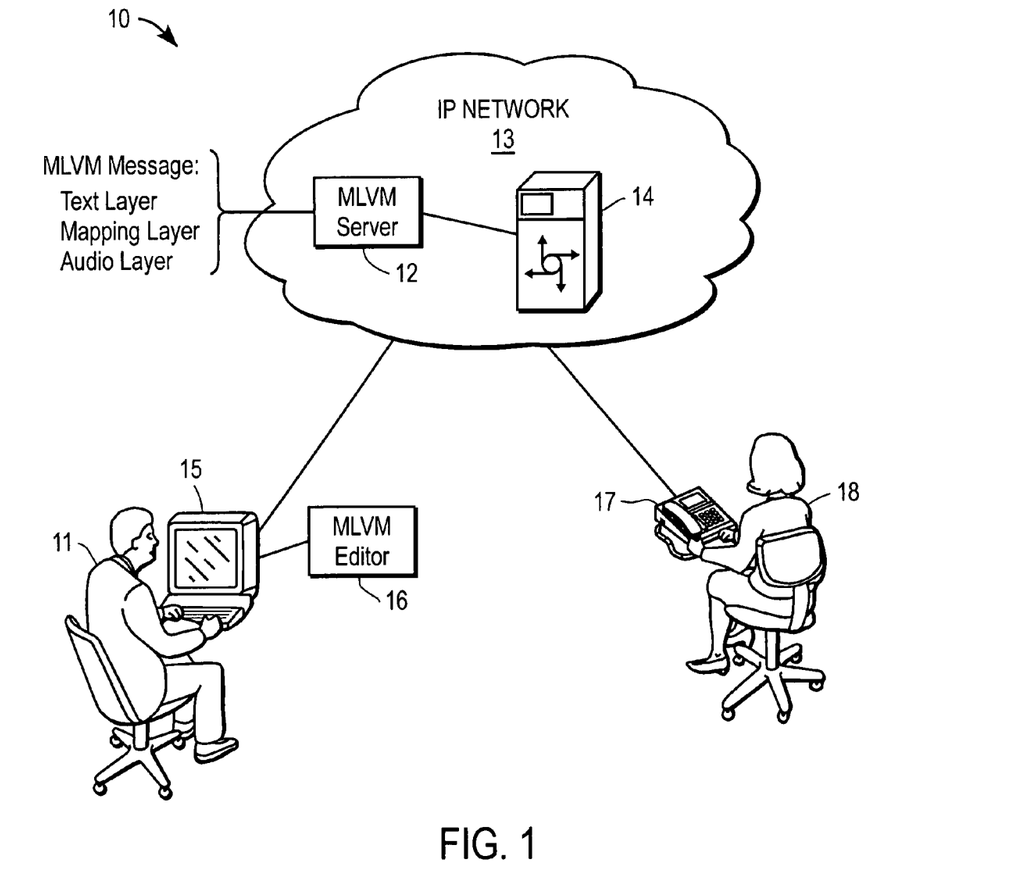
FIG. 1 illustrates an example communications system with voice messaging capabilities.

Referring to FIG. 1, an example communications system 10 is shown with voice messaging capabilities provided by a UMS 14 (e.g., an application or code running on a server) attached to a digital network 13. A Multi-Layer Voice Messaging Server (MLVM-Server) 12, also attached to network 13, is shown attached to UMS 14. Individual users 11 and 18 may send/retrieve messages to/from UMS 14 (and take responsive actions thereto) utilizing any number of different endpoint devices and communication paths. For example, user 11 is shown using a PC 15 to call into UMS 14 to leave a voicemail message for user (recipient) 18. User 11 is also shown utilizing a Multi-Layer Voice Messaging Editor (MLVM-Editor) 16 that translates his recorded speech into text appearing on the screen of his PC 15 to facilitate editing of his voice message. User 18 may listen to her voicemail messages and initiate responsive actions using telephone (e.g., a VoIP phone), which is shown attached to network 13. Users 11 and 18 may also connect with UMS 14 using other types of endpoint devices that provide two-way communications with UMS 14 over one or more network connections.

In the embodiment shown, MLVM-Server 12 comprises an add-on hardware (firmware) and/or software module to UMS 14 and utilizes standard speech-to-text (STT) capabilities in real-time to create a Multi-Layered VoiceMail Message (MLVM-Message). That is, MLVM-Server 14 may incorporate or be associated with a STT converter for converting a voice message to text for editing by a user, as well as a text-to-speech (TTS) converter for converting a text message to audible speech.

The MLVM-Message has a data structure which comprises an Audio Layer, which is the actual audio data consisting of the user's speech recorded in any one of a number of different data formats (e.g., .wav, G711, etc.), a Text Layer, which is the text data generated as a result of the translation of audio data using an STT converter, and a Text-to-Audio Mapping Layer, which is a layer that maps each unit within the Text Layer (e.g. text word) to its corresponding segment or unit (chunk of audio data) in the Audio Layer, and vice versa. By way of example, when user 11 calls into UMS 14 and starts recording a voicemail message, MLVM-Server 12 creates, in real-time, the translated Text Layer and the Mapping Layer that links the generated text to the corresponding audio data in the Audio Layer of the MLVM-Message.

In the embodiment of FIG. 1, MLVM-Editor 16 comprises a "client" application or plug-in module (i.e., executable code) that runs on the user's client device (e.g. PC 15). MLVM-Editor 16 may be invoked by user 11 to operate on the MLVM-Message created by MLVM-Server 12. MLVM-Editor 16 provides user 11 with a textual interface (e.g., a graphical user interface (GUI)), for viewing and editing of the recorded voice message, either in real-time or after the complete message has been recorded. For example, while user 11 is recording his voicemail message for recipient 18 he may utilize MLVM-Editor 16 to view his recorded speech as a corresponding text translation displayed on the screen of PC 15 (either in real-time or at the end of the recording). In other words, MLVM-Editor 16 displays the content of the Text Layer of the MLVM-Message created by MLVM-Server 12 as user 11 speaks.

In the event that user 11 makes a mistake while recording his message, he may finish recording the remainder of his voice message and then use MLVM-Editor 16 to easily scroll through the text to locate the portion of the message that needs to be edited. Once that portion of the text has been located, user 11 may perform normal text editing, such as deleting or moving text from one portion of the message to another. MLVM-Editor 16, by utilizing the Text-to-Audio Mapping Layer of the corresponding MLVM-Message, automatically "mirrors" the exact editing to the corresponding audio data in the Audio Layer of the MLVM-Message. In another example embodiment, rather than using TTS the system identifies and utilizes recorded words with the voice of user 11.

Figure 2A:
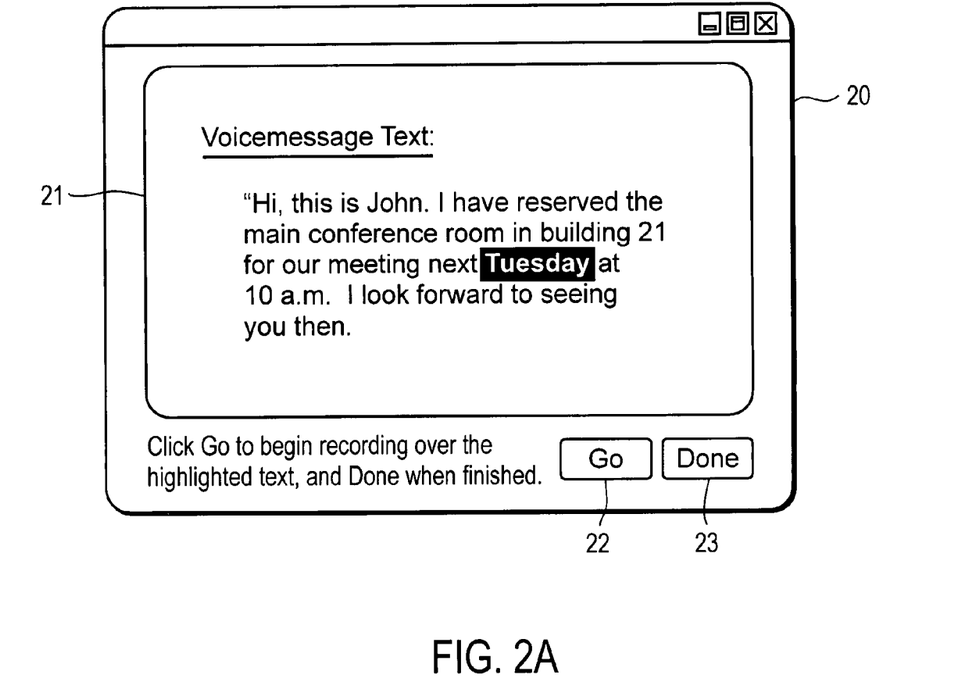
FIG. 2A illustrates an example of a voicemail message displayed as text using a graphical user interface.

FIG. 2A illustrates an example of a voicemail message displayed as text in a GUI window 20 generated by MLVM-Editor 16. FIG. 2A shows GUI window 20 comprising a text box or field 21 that includes the translated text of the audio data corresponding to the user's recorded voice message. An instruction/command field at the bottom of GUI window 20 includes a "Go" command button (icon) 20 that may be clicked-on or otherwise selected by a user to cause the MLVM-Editor 16 to start recording new audio data (speech) to replace the portion of audio data corresponding to the text highlighted by the user (e.g., "Tuesday"). In other words, clicking icon button 22 allows the user to record over a portion of his voicemail message that he wants to change or correct. When the user has finished recording the new speech in replacement of the highlighted portion, he may click-on or otherwise select the "Done" command button (icon) 23.

Figure 2B:
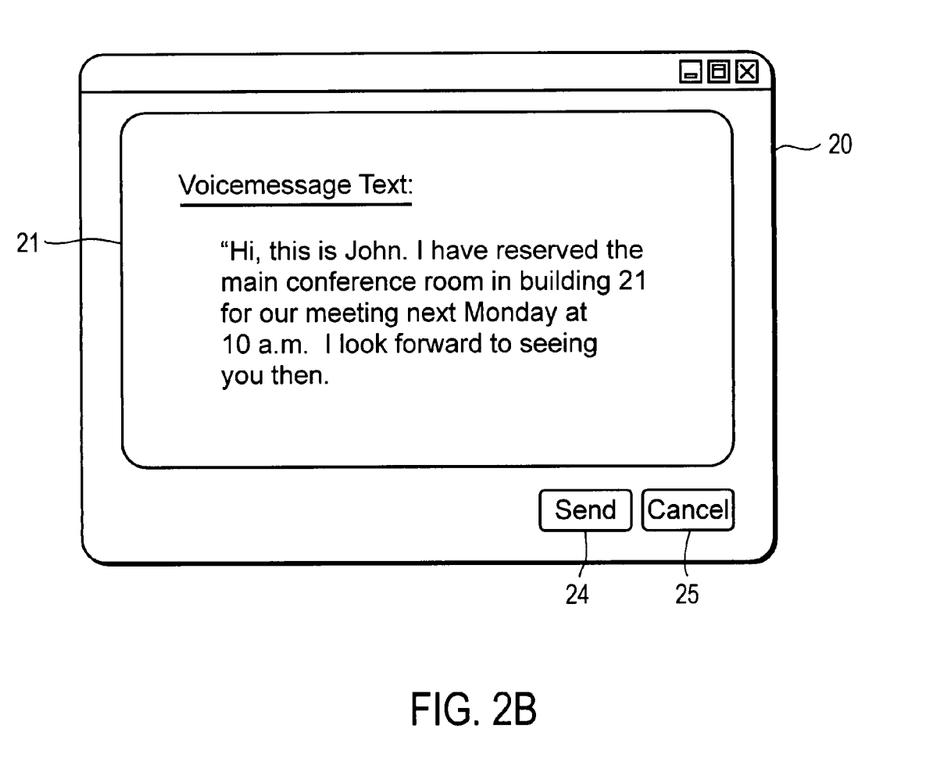
FIG. 2B illustrates the example of FIG. 2A after editing of the message text.

FIG. 2B illustrates the example of FIG. 2A after editing of the message text, which, in this case, involved changing the word "Tuesday" to "Monday" in the voicemail message. Note that in the embodiment shown, clicking-on icon 23 (see FIG. 2A) has the effect of changing the command field icons. With no highlighted text in field 21, GUI window 20 presents the user with the option of either sending the voice message as it appears in field 21 (i.e., by clicking "Send" button 24), or cancelling the changes previously made (i.e., by clicking "Cancel" button 25). The user may also choose to highlight another portion of the text, which automatically causes the instruction/command field with buttons 22 & 23 to appear at the bottom of window 20.

Note that clicking on Send button 24 causes the modified audio data file(s) comprising the edited voicemail message to be placed or stored in the intended recipient's mailbox of UMS 14.

In another embodiment, a user of MLVM-Editor 16 may display the Text Layer data (i.e., a text view of the voice message) to find a place in the message where he forgot to say something. For example, if he forgot to leave his administrative assistant's name and phone number he could scroll through or search the text view/message and, using his cursor, highlight the space or word(s) where the new speech is to be inserted. In an alternative implementation, the user may simply position his cursor and hit a "Record" button or icon appearing in GUI window 20 or otherwise invoke recording by another command input (e.g., keypad sequence or combination). The user may then record (by speaking) the missing information (e.g., "Please call my assistant Mary at 408-902-1234 and let her know if you are available"). In this case, MLVM-Editor 16 inserts the newly recorded audio data in the corresponding location of the MLVM-Message Audio Layer, as well as inserting the corresponding text (audio-to-text translated) into the MLVM-Message Text Layer at the appropriate position in text field 21.

Practitioners in the art will understand that MLVM-Editor 16 may run on the user's PC, or, alternatively, the GUI shown in FIGS. 2A & 2B may comprise a collaborative web-based application that is accessed by the browser software running on the user's PC. In other instances, the editor GUI may comprise a downloaded application, or other forms of computer-executable code that may be loaded or accessed by a participant's PC. For instance, the software code for implementing the MLVM-Editor functions may be incorporated into, and executed on, server 12, which may be accessed by callers to UMS 14 who want to utilize the features provided therein. In another embodiment, instead of running on server 12, MLVM-Editor 16 may run on a different server attached to network 13. It is further appreciated that the editor function described herein may be invoked automatically by the system, or in response to certain user input / action, such as by pressing a certain predefined function key on his endpoint device, or in response to an interactive voice response (IVR) system prompt (e.g., "Do you want to edit any portion of your voice message before sending it?").

In accordance with another embodiment, a user may use the MLVM-Editor to delete/change portions of the recorded message, or insert additional or missing information, by typing new text at appropriate position in the displayed text field. In other words, instead of recording new speech as described above, the system allows the user to simply update the Text layer by typing new text. The system then updates the corresponding audio data using a standard TTS converter. In a specific implementation, the TTS engine may use voice characteristics of the user extracted from the recorded speech (or from stored data files of the user's speech) for converting the text to speech, thereby matching the text-to-speech portion with the rest of recorded message.

In still another embodiment, the user can mark a text segment from the Text Layer of a MLVM-Message (i.e., the textual view of the voicemail message) using the MLVM-Editor and cut/paste that segment to another place in the MLVM-Message, or even into another MLVM-Message. This cut/paste operation has the effect of moving a copy of the audio data corresponding to the cut text data, as well as moving the corresponding and Text-to-Audio Mapping Layer segments.

Additionally, rather than using a TTS module to generate speech that attempts to emulate the voice of user 11, the system searches within existing voice messages for words, sound patterns, or utterances that are similar to those needed for the editing task. The system may utilize the words, sound patterns, or utterances rather than the TTS generated speech.

Figure 3:
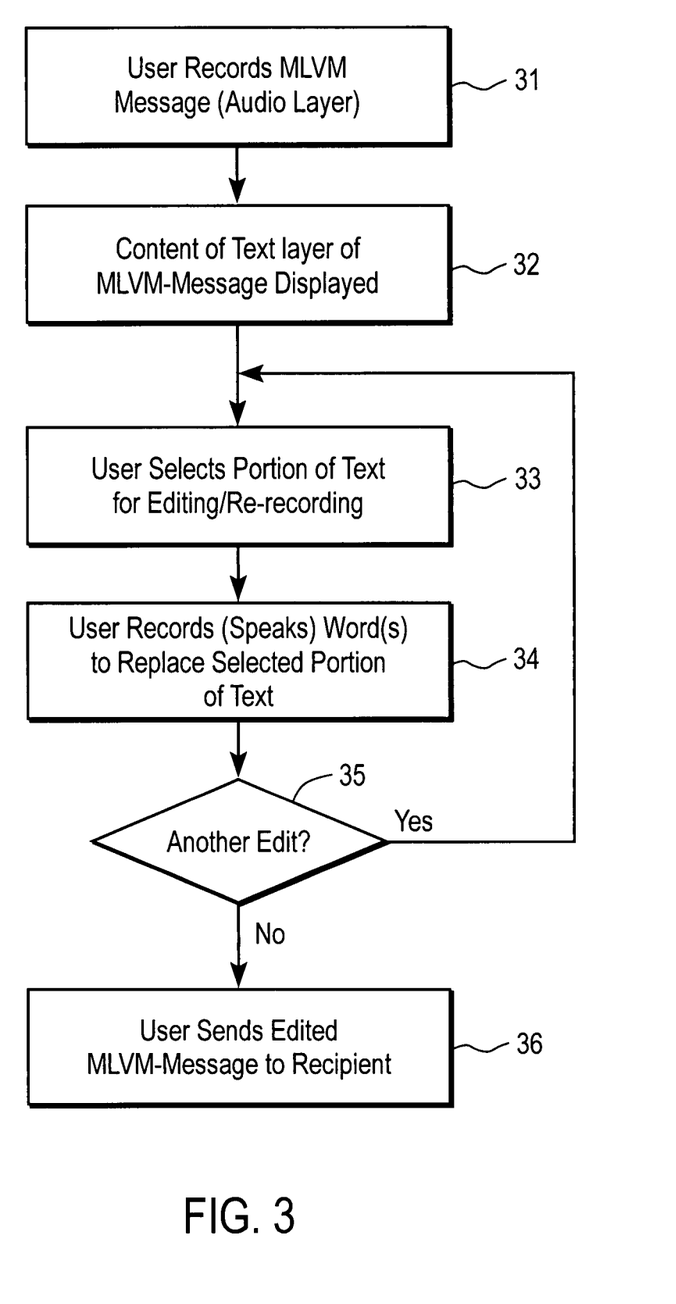
FIG. 3 illustrates an example method of operation for the communications system of FIG. 1.

FIG. 3 illustrates an example method of operation for the communications system of FIG. 1. The process begins with the user/caller dialed into the UMS (server) and either in the process of recording his voicemail message or having just finished a recording (block 31). As the user speaks the UMS translates the user's speech into text and creates a MLVM-Message comprising the Audio, Text and Mapping Layers described previously. Either automatically, or in response to a command input of the user (e.g., invoking the MLVM-Editor), the content of the Text Layer of the MLVM-Message is displayed to the user (block 32). This textual view of the voicemail message allows the user to select a word or portion of the text for editing/re-recording (block 33). For example, using the text oriented/user-friendly MLVM-Editor the user can quickly locate the right position within a voicemail message where the user would like to replace an existing portion of the original message or insert newly recorded speech. In the example shown, the user records one or more words in replacement of the selected portion of the displayed text (block 34). Other types of known text editing operations (e.g., insertion, augmentation, drag and drop, copy/paste) may also be performed.

Note that according to the method shown, the edited voice message (using textual view) is recorded in user's own voice. In other embodiments, a computer-generated voice, or a computer-synthesized version of the user's voice (based on the user's detected or stored voice characteristics) may be utilized for edits to the audio data.

It is appreciated that the MLVM-Editor may also provides a user-friendly way to locate a voice segment (through the textual view), which segment can be copy/cut and pasted into another place in that same multi-layer message or into another multi-layer voicemail message.

Once the user has finished inserting newly recorded speech into the MLVM-Message, or deleting/replacing portions of the message, he is given the option of making another edit (block 35). If the user elects to make further edits to his message, the process returns to block 33. On the other hand, once editing has been completed the user may then send the voice portion (i.e., audio data) of the message to the intended recipient (block 36). This latter step may be initiated simply by closing the GUI window provided by the MLVM-Editor on the user's PC display screen. The recipient may retrieve the voicemail message by accessing her mailbox within the UMS any time thereafter.

Figure 4:
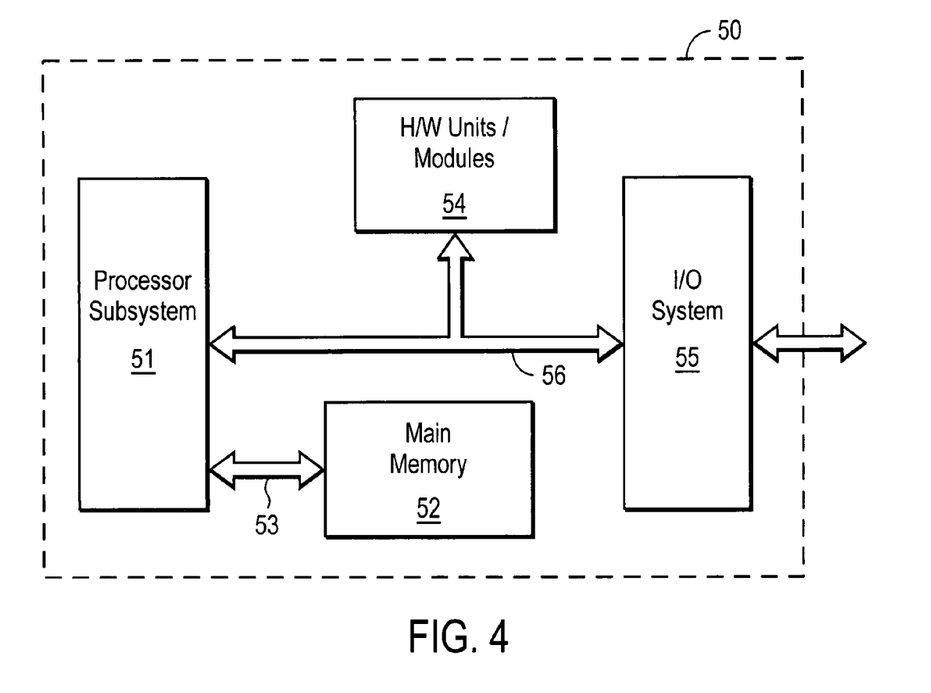
FIG. 4 illustrates an example network node or device.

FIG. 4 is a generalized block diagram showing an example network device or node 50, such as may comprise any of the systems, devices, or nodes (e.g., a PC or server) shown or described above. Node 50 includes a processor subsystem 51 coupled with a memory unit (main memory) 52 via a memory bus 53, one or more hardware (and/or software/firmware) modules 54, and an input/output (I/O) system 55 via a system bus 56. Modules 54 may include software, firmware, or logic embedded in hardware for implementing any of the functions described herein, e.g., those functions associated with editing a voicemail message recorded by a user, etc.

It is appreciated that any unified messaging/voicemail system utilized by or in conjunction with node 50 may comprise separate hardware devices coupled to the system bus 56, or, alternatively, implemented as software programs or modules 54 that run on one or more processors of subsystem 51. In other words, the composing, sending, storing, and receiving of electronic messages, as well as other associated functions may be implemented as separate hardware devices, memory locations (storing executable code), firmware devices, software modules, or other machine-readable devices. (In the context of the present application, therefore, the term "module" is to be understood as being synonymous with both hardware devices and computer-executable software code, programs or routines.) Additionally, although voice messaging has been specifically described in the above examples, it should be understood that the concepts presented are equally applicable to all types of multimedia messaging.

It should be further understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. For instance, although functions and methods of various embodiments have been described as being embodied on a UMS coupled to a server via an IP network, it is appreciated that these same methods and functions may be embodied on an endpoint device of a user, another server or client, a messaging application, or a third party service application program accessible via a web-based browser. Accordingly, the specification and drawings are to be regarded in an illustrative rather than a restrictive sense.

We claim:

1. A computer-implemented method for a unified messaging system (UMS) running on one or more network nodes comprising:
   creating a Multi-Layered Voicemail (MLVM) message in a UMS mailbox of a recipient, the MLVM message being left by a caller from an endpoint, the MLVM message including an audio layer comprising audio data corresponding to speech of the caller, a text layer comprising text data generated from a translation of the audio data, and a mapping layer that maps each word in the text layer to a corresponding segment of audio data in the audio layer;
   receiving input from a graphical user interface (GUI) running on the endpoint, the input comprising edits made by the caller via the GUI to one or more words of the text layer;
   changing one or more segments of audio data in the audio layer in correspondence with the edits to the one or more words of the text layer, wherein the changing comprises:
      in response to receiving the edits to the one or more words of the text layer:
         automatically searching one or more databases for a user's previous recording of one or more sound patterns that correspond to the edits to the one or more words of the text layer;
         generating one or more new segments of audio data based on the one or more sound patterns and the edits to the one or more words of the text layer; and
         inserting the one or more new segments of audio data at a position in the audio layer corresponding to a location where the edits to the one or more words of the text layer were added to the text layer;
   storing the MLVM message with the changed one or more segments of audio data in the UMS mailbox of the recipient.

2. A non-transitory computer-readable storage medium encoded with a computer program, when executed, the computer program operable to:
   record speech of a caller as an audio data file, the speech comprising a voicemail message for a recipient;
   translating the speech into a text file for display on a graphical user interface (GUI) running on an endpoint associated with the caller;
   map each word of the text file to a corresponding segment of audio data of the recorded speech;
   receive input from the GUI that identifies a location within the text file and adds additional text to the text file at the location;
   in response to receiving the input:
      automatically search one or more databases for a user's previous recording of one or more sound patterns that correspond to the additional text;
      generate one or more new segments of audio data based on the one or more sound patterns and the additional text; and
      insert the one or more new segments of audio data at a position in the audio data file corresponding to the location where the additional text was added to the text file.

3. A system comprising:
   one or more network nodes running one or more application programs that implement a unified messaging system (UMS), the one of the nodes including:
      one or more processors; and
      a memory comprising one or more instructions executable at the processors, the one or more processors being operable, when executing the instructions, to:
         create a Multi-Layered Voicemail (MLVM) message from speech left by a caller associated with an endpoint, the MLVM message including an audio layer comprising audio data corresponding to the speech, a text layer comprising text data generated from a translation of the audio data, and a mapping layer that maps each word in the text layer to a corresponding segment of audio data in the audio layer;
         receive input from a graphical user interface (GUI) running on the endpoint, the input comprising one or more edits to the text layer;
         in response to receiving the input:
            automatically search one or more databases for a user's previous recording of one or more sound patterns that correspond to additional text included in the input;
            generate one or more new segments of audio data based on the one or more sound patterns and the additional text; and
            insert the one or more new segments of audio data at a position in the audio layer corresponding to a location where the additional text was added to the text data file; and
         store the MLVM message with the one or more segments of audio data in the UMS mailbox of the recipient.

4. A computer-implemented method for a unified messaging system (UMS) comprising:
   recording, by the UMS, speech of a user as an audio data file, the speech comprising a voicemail message intended for a recipient;
   translating, by the UMS, the audio data file into a text data file;
   mapping, by the UMS, each word within the text data file to a corresponding segment of audio data in the audio data file;
   editing one or more segments of the audio data file to produce an edited voicemail message, the editing being based on input commands received from the user, the input commands including operations on one or more words in the text data file which correspond to the one or more segments in the audio data file, the editing comprising replacing a segment in the audio data file corresponding to a selected word in the text data file with a new segment which comprises new speech of the user; and
   sending the edited voicemail message to the recipient; and
   wherein the editing comprises:
      receiving typed input from the user which adds additional text to the text data file; and
      in response to receiving the typed input from the user:
         automatically searching one or more databases for a user's previous recording of one or more sound patterns that correspond to the additional text;
         generating one or more new segments of audio data based on the one or more sound patterns and the additional text; and
         inserting the one or more new segments of audio data at a position in the audio data file corresponding to a location where the additional text was added to the text data file.

5. The computer-implemented method of claim 4 further comprising displaying the text data file on a display screen of an endpoint utilized by the user.

6. The computer-implemented method of claim 4 further comprising prompting the user to make edits to the voicemail message.

7. The computer-implemented method of claim 4 further comprising storing the edited voicemail message as audio data in a mailbox of the recipient in the UMS.

* * * * *